United States Patent [19]

Haginomori

[11] 4,378,461
[45] Mar. 29, 1983

[54] GAS INSULATED BUS WITH COOLING MEANS

[75] Inventor: Eiichi Haginomori, Tokyo, Japan

[73] Assignee: Tokyo Shibaura Denki Kabushiki Kaisha, Kawasaki, Japan

[21] Appl. No.: 301,102

[22] Filed: Sep. 10, 1981

[30] Foreign Application Priority Data

Sep. 11, 1980 [JP] Japan .................................. 55-126318

[51] Int. Cl.³ .............................................. H02G 5/10
[52] U.S. Cl. .................................. 174/16 B; 174/15 C
[58] Field of Search ........................... 174/15 C, 16 B

[56] References Cited

FOREIGN PATENT DOCUMENTS

| 2707205 | 8/1978 | Fed. Rep. of Germany | 174/16 B |
| 53-10507 | 3/1978 | Japan | 174/16 B |
| 53-10508 | 3/1978 | Japan | 174/16 B |

*Primary Examiner*—Laramie E. Askin
*Attorney, Agent, or Firm*—Oblon, Fisher, Spivak, McClelland & Maier

[57] ABSTRACT

A gas insulated bus is provided with a tubular conductor inside a grounded metal sheath filled with an insulating gas. The tubular conductor includes gas inlet holes, positioned a predetermined distance apart from each other, and a gas outlet which is formed in the tubular conductor at an intermediate point between the gas inlet holes. A cooling case is attached to the sheath at a position corresponding to the gas outlet, and the gas outlet communicates with the cooling case by means of a tubular passage device, whereby the heated insulating gas within the tubular conductor is circulated by natural convection from the gas outlet to the gas inlet holes through the cooling case to cool the gas.

6 Claims, 1 Drawing Figure

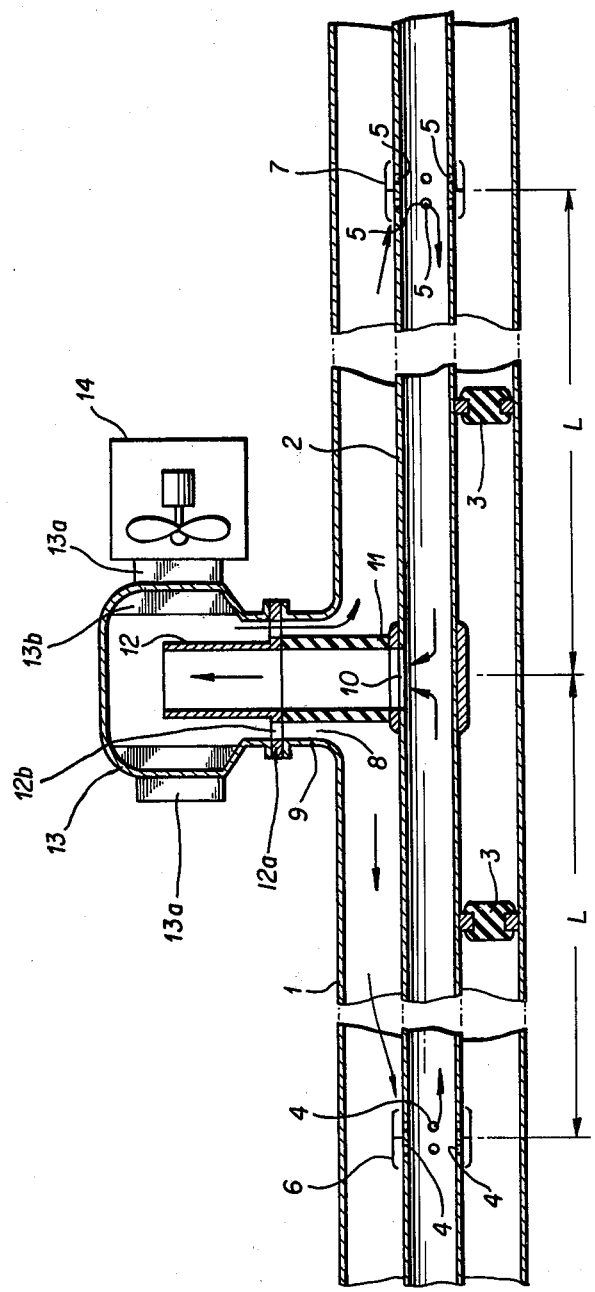

GAS INSULATED BUS WITH COOLING MEANS

BACKGROUND OF THE INVENTION

1. Field of the Invention

The present invention generally relates to a gas insulated bus, and more particularly to a gas insulated bus which is capable of increased conduction capacity.

2. Description of the Prior Art

A gas insulated bus which has an axial cylindrical conductor inside a grounded metal sheath filled with a compressed gas has excellent insulating characteristics. Sulfur hexafluoride (SF6) has generally been used in practice as the insulating gas.

As a way of increasing the current conducting capacity of the conductor in such a gas insulated bus, it has been known to increase the dimension in the radial direction of the sheath and conductor so as to reduce the resistance value of the conductor, while increasing the surface area for radiating heat from the conductor and sheath. Such a known device however, has the defects of increased area of installation and greater cost.

As another method for increasing the current conducting capacity of the conductor, a gas insulated bus which has a circulating device for forced circulation of gas inside the cylindrical conductor or the sheath, as well as a cooling device for cooling the circulated gas, has been known. Such a gas insulated bus, however, has the defects that it is necessary to mount these circulation and cooling devices within the gas insulated bus. Moreover, the bus must be rendered non-conductive when these devices, which are not concerned with rendering the bus conductive, are regularly inspected.

SUMMARY OF THE INVENTION

Accordingly, it is one object of this invention to provide a new and improved gas insulated bus device which is capable of increased conduction capacity.

Another object of this invention is to provide a new and improved gas insulated bus device in which increases in the dimensions thereof can be restricted, and in which the conductor in the gas insulated bus device is cooled without mounting a movable device for cooling the conductor in the gas insulated bus itself.

Briefly, in accordance with one aspect of this invention, a gas insulated bus device is provided with a tubular conductor inside a grounded metal sheath filled with an insulating gas. The tubular conductor includes gas inlet holes, positioned a predetermined distance apart from each other, and a gas outlet which is formed in the tubular conductor at an intermediate point between the gas inlet holes. A cooling case is attached to the sheath at a position corresponding to the gas outlet, and the gas outlet communicates with the cooling case by means of a tubular passage device, whereby the heated insulating gas within the tubular conductor is circulated by natural convection from the gas outlet to the gas inlet holes through the cooling case to cool the gas.

BRIEF DESCRIPTION OF THE DRAWINGS

A more complete appreciation of the invention will be readily obtained as the same becomes better understood by reference to the following detailed description when considered in connection with the accompanying drawing, wherein:

The FIGURE is a cross-sectional view showing one embodiment of a gas insulated bus device according to the present invention.

DETAILED DESCRIPTION OF THE PREFERRED EMBODIMENT

Referring now to the FIGURE, wherein one preferred embodiment of a gas insulated bus device in accordance with this invention is shown, the bus device includes a metal sheath 1 which is mounted and earth-grounded in horizontal position and is filled with an insulating gas, for instance sulfur hexafluoride (SF6) at a pressure of 3 $Kg/Cm^3$.g.

A hollow tubular conductor 2 is mounted within the sheath 1 in coaxial relation therewith and is insulated and supported by insulating spacers 3. Gas inlet holes or openings 4 and 5, through which the SF6 is passed, are provided at predetermined spaced positions of the conductor 2. In order to make the electric field about the gas inlet holes 4 and 5 relax, shielding members 6 and 7 are mounted around the holes.

A projecting portion 9 having an aperture or opening 8 is provided on the center or intermediate portion of the bus device between gas inlet holes 4 and 5 in the conductor 2, that is, on the upper side of the sheath 1 at a respective distance L from each of the holes 4 and 5.

In a portion of conductor 2 corresponding to the aperture 8, a gas outlet 10 is formed, and one end of an insulating tubular member 11 is air-tightly mounted on or around the gas outlet 10. Another end of insulating member 11 extends to the aperture 8 of projecting portion 9 of sheath 1. As a result, the conductor 2 is also supported by the projecting portion 9 of sheath 1 through the insulating tubular member 11 and the metalic tube 12. Pass through holes 12b, through which SF6 gas passes, are formed in a portion of flange 12a corresponding to aperture 8.

A cooling case 13 is air-tightly mounted on the flange 12a of metalic tube 12 so as to surround or encircle the metallic tube 12 projecting from sheath 1. A plurality of cooling fins 13a and 13b are respectively attached to the outer and inner sides of case 13.

Moreover, a cooling fan unit 14 is attached to the outer fins 13a to force cool the case 13.

It should be understood that the insulating member 11 and metallic tube 12 form a chimney or smokestack-like cylinder projecting from conductor 2 at a right angle thereto.

In the above embodiment of the present invention, when an electric current flows through conductor 2, the SF6 gas within tubular conductor 2, insulating member 11 and metalic tube 12 is heated and expands.

On the other hand, the SF6 gas cooled within cooling case 13 and the SF6 gas between sheath 1 and conductor 2 are at a relatively low temperature compared with that of the SF6 gas within conductor 2.

As a result, a temperature and density difference between the two SF6 gasses mentioned above is generated. Accordingly, the SF6 gas within conductor 2 flows from the conductor 2 to the cooling case 13 through the gas outlet 10, insulating member 11 and metallic tube 12. The SF6 gas cooled within cooling case 13 then flows into the interior of conductor 2 through pass through holes 12b, aperture 8 and gas inlet holes 4 and 5. Thus, natural (for example, convection-like) circulation is accomplished, as indicated by the arrows in the FIGURE.

As an example, the inner and outer diameters of conductor 2 are 130 mm and 150 mm, respectively, and conductor 2 is made of an alloy of aluminium. The distance L from the gas inlet holes 4 and 5 to the gas outlet 10 of conductor 2 is ten meters.

Assuming that a temperature rise of about 50 degrees C. in conductor is permitted by conventional natural cooling, the current limit for conductor 2 is about 5000 A and at that time an amount of heat generated in conductor 2 is about 230 W/m.

On the other hand, if an electric current of 8000 A flows through conductor 2 of the above gas insulated bus, the amount of heating of conductor 2 per ten meters is 5900 W.

It should be readily apparent that an amount of heating of 2300 W (equal to 230 W/m × 10 m) can be naturally cooled from the outer surface of the conductor 2 to the atmosphere via the SF6 gas and the sheath 1. It should be therefore understood that the remaining heat, that is 3600 W(5900 W-2300 W), must be cooled in the cooling case 13.

If it is assumed that heat capacity of gas pressurized to 3 $kg/cm^3.g$ is 19 Joul/l.°C. where l means liters, and the temperature difference between the gas at the gas inlet holes 4 and 5 and that at a gas outlet 10 is about 20 degrees C., the remaining heat can be cooled by providing a gas flow of 9.5 l/sec.

It is assumed that sufficient thermal conductivity between the inner side of conductor 2 and the gas therein can be obtained by generation of irregular gas flow within conductor 2. In order to obtain sufficient thermal conductivity, it is, for instance, effective that the area of the inner surface of conductor 2 is increased by forming grooves or unevenness on the inner surface of conductor 2.

The gas flow within conductor 2 is 0.71 m/sec because of the inner cross-section of 130 $cm^2$ of conductor 2. The gas head loss generated when the SF6 gas flows a distance L is about 0.04 m.

If it is assumed that the height of the chimney-like portion (i.e. the sum of the series connection of insulating member 11 and metallic tube 12) is one meter and the temperature of the SF6 gas is 300 degree K., the temperature difference $\Delta tC$. can be obtained by computing: $\Delta t°C./300° K. \times 1 m = 0.04 m$. That is, $\Delta t$ equals 12 degrees C.

Thus, if there is a temperature difference of 12 degree C. between the ends of the vertical series connection tubes, a desired gas flow as described above can be accomplished.

It should be understood that obtaining such a temperature difference is easily achieved by providing the cooling case 13.

Under some circumstances, by forced cooling of the cooling case 13 using the cooling fan unit 14 it is possible to generate a large temperature difference.

In accordance with the teachings of the present invention it is possible to increase the cooling effect of the tubular conductor 2, to increase the gas flow rate and to increase the electric current carrying capacity of the conductor 2.

Moreover, according to the present invention, it is possible to increase the electric current carrying capacity (i.e. the capacity of conductor 2 to carry electric current) by about sixty percent or more compared with that of conventional natural cooling and without increasing the dimensions of the overall device.

Furthermore, in accordance with the present invention, since moving parts as in a conventional device have been not employed or mounted within the gas insulated bus device, it is possible to easily maintain and inspect the gas insulated bus.

Thus, although the invention has been explained by way of example with the employment of a single tubular conductor which is mounted within the sheath, it should be apparent that if desired a plurality of conductors, for example three conductors as a three-phase power line, could be mounted by providing a respective chimney-like cylinder from each conductor to the cooling case.

Moreover, instead of the cooling fan unit 14, if desired a water cooler or other conventional cooler could be utilized.

It is therefore to be understood that within the scope of the appended claims, the invention may be practiced otherwise than as specifically described herein.

What is claimed as new and desired to be secured by Letters Patent of the United States is:

1. A gas insulated bus comprising:
   a horizontally extending grounded metal sheath filled with an insulating gas;
   a tubular conductor inside said sheath;
   case means extending upwardly and outwardly from said sheath;
   cooling means mounted at said case means for the cooling thereof;
   first communicating means including a tubular member for communicating said case means with the inside of said tubular conductor, said first communicating means being mounted at a first position which corresponds to the position of said sheath from which said case means extend; and
   second communicating means for communicating said case means with the inside of said tubular conductor, said second communicating means being positioned at a second position spaced from said first position,
   said sheath, said tubular conductor, said case means, and said first and second communicating means providing a gas circulation circuit, and natural convection means providing the only gas circulation for said gas circulation circuit.

2. The gas insulated bus of claim 1, wherein said tubular member is formed of an insulating material.

3. The gas insulated bus of claim 1, wherein said case means includes said cooling means having the form of a cooling casing having cooling fins.

4. The gas insulated bus of claim 3, wherein said cooling fins are mounted on one of the inside and outside of said cooling casing.

5. The gas insulated bus of claim 3, including an electric fan unit mounted on the exterior of said cooling casing.

6. The gas insulated bus of claim 1, wherein one end of said tubular member is air tightly attached to said conductor for communicating the interior of said tubular conductor with said casing means.

* * * * *